(12) United States Patent
Goss

(10) Patent No.: US 7,330,693 B1
(45) Date of Patent: Feb. 12, 2008

(54) BROADCAST CHANNELS FOR WIRELESS TELEPHONY

(75) Inventor: Stephen Clifford Goss, Wheaton, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/399,304

(22) Filed: Sep. 17, 1999

(51) Int. Cl.
*H04H 1/00* (2006.01)

(52) U.S. Cl. ............... 455/3.01; 455/434; 455/567; 455/458

(58) Field of Classification Search ........... 455/403, 455/454, 414, 450, 451, 452, 464, 434, 435, 455/466, 3.01, 3.02, 3.03, 412.2, 452.1, 435.1, 455/452.2, 567, 458, 426, 521, 419, 429, 455/517, 515; 370/312, 329
See application file for complete search history.

(56) References Cited

U.S. PATENT DOCUMENTS

| | | | | |
|---|---|---|---|---|
| 5,625,886 | A * | 4/1997 | Raes | 455/519 |
| 5,790,951 | A * | 8/1998 | Tayloe et al. | 455/13.2 |
| 5,909,651 | A * | 6/1999 | Chander | 455/466 |
| 5,930,679 | A * | 7/1999 | Olds et al. | 455/434 |
| 5,959,546 | A * | 9/1999 | Dorenbosch | 455/432.1 |
| 5,974,092 | A * | 10/1999 | Roos et al. | 375/272 |
| 6,026,289 | A * | 2/2000 | Zellner | 455/403 |
| 6,073,005 | A * | 6/2000 | Raith et al. | 455/404.1 |
| 6,073,235 | A * | 6/2000 | Foladare et al. | 370/320 |
| 6,088,577 | A * | 7/2000 | Yang et al. | 455/72 |
| 6,092,102 | A * | 7/2000 | Wagner | 340/7.29 |
| 6,169,894 | B1 * | 1/2001 | McCormick et al. | 455/414.1 |
| 6,397,076 | B1 * | 5/2002 | Brown et al. | 455/521 |
| 6,526,027 | B1 * | 2/2003 | Yeom | 370/312 |
| 6,606,502 | B1 * | 8/2003 | Chung Kam Chung et al. | 455/466 |

* cited by examiner

*Primary Examiner*—Thanh Le
*Assistant Examiner*—John J. Lee

(57) ABSTRACT

A wireless system and method for providing informative broadcast services includes a plurality of base stations, each serving a plurality of wireless communications device users via a plurality of communications channels. An alert message is first transmitted to wireless communications devices advising of the availability of a broadcast message and identifying an associated communications channel. The base station then transmits the broadcast message to the plurality of users on the identified channel. The wireless communications devices may automatically switch to the broadcast channel, for example, when there is a weather or other emergency, or may offer the user the opportunity to change channels. Also, a user may initiate a request to access a broadcast channel for services such as news, sports, or stock reports on a subscription basis.

25 Claims, 5 Drawing Sheets

BROADCAST ANNOUNCEMENT MESSAGE

| 722 | 712 | 714 | 716 | 718 | 720 |
|---|---|---|---|---|---|
| BROADCAST NUMBER | TRAFFIC CHANNEL FOR BROADCAST | DISPLAY PARAMETER | PERMISSION PARAMETER | PRIORITY PARAMETER | EXPIRED |

*FIG. 7*

BROADCAST CHANNELS FOR WIRELESS TELEPHONY

TECHNICAL FIELD

This invention relates to the field of wireless telephony and, more specifically, to broadcast capabilities and messaging services that enable a live or recorded message to be broadcast to a plurality of users over a wireless air interface.

BACKGROUND OF THE INVENTION

Consumer use of wireless telephony has increased exponentially over the past several years. This trend shows no indication of changing. In fact, there are many new wireless service providers vying for customers with the established service providers. To this end, the various service providers are trying to differentiate themselves through advertising, service offerings, etc.

One of the major differentiators among the service providers is the features that the service provider can offer to the consumer. Often these features are heavily advertised. At the same time, as consumers become more sophisticated, their demand for information on the move is also increasing. Therefore, there is a need for capabilities to keep people informed while they are using wireless communications equipment either in the car or in other situations.

SUMMARY OF THE INVENTION

By this invention, a technical advance is achieved in the art through a system and method for providing informative broadcast services over wireless communications systems. The content of such broadcast services may include weather broadcasts, emergency bulletins, news, sports, or any other information or human-understandable message that may be suitable for distribution via a broadcast medium. According to one aspect of the invention, in a wireless network that includes a plurality of base stations, each serving a plurality of users via a plurality of communications channels, an alerting message is sent to Wireless Communications Devices (WCDs), which may, for example, be wireless telephones or other similar wireless communications subscriber terminals. The alerting message includes the identity of one of the communications channels which is to be used as a "broadcast" channel to carry the human-understandable message. The base station then transmits the human-understandable "broadcast" message to the plurality of users on the identified broadcast channel. The WCDs may automatically switch to the broadcast channel, for example, when there is a weather or other emergency, or may offer the user the opportunity to change channels. Also, a user may initiate a request for access to a broadcast channel for programs, such as news, sports, or stock reports, which may be provided, for example, on a subscription basis.

A WCD constructed according to this invention may include all of the features available in existing WCDs. In addition, the WCD preferably includes the capability to receive a message indicating that a broadcast is available, and the capability to notify the user that the broadcast is pending. Preferably, these capabilities are available both while the WCD is idle, and while the WCD is in operation (e.g., in use on a telephone call). The user may indicate response via the normal keypad or a special key on the WCD. If the user responds positively, the WCD preferably changes the communications channel to the broadcast channel. The user may ignore the broadcast, toggle between the broadcast and an existing call, or listen to the broadcast message until such message is completed. The base station then sends a "message complete" message, and the WCD terminates reception of the broadcast. Preferably, the WCD does not enable transmission on the "reverse," or WCD-to-base station path of the broadcast communications channel, in order to minimize interference that would otherwise be caused from transmission on the reverse path by the plurality of users receiving the broadcast. Alternatively, the WCD may allow limited transmission on the reverse channel to allow users to, for example, transmit short keypad sequences in response to menu items conveyed in the broadcast message.

BRIEF DESCRIPTION OF THE DRAWINGS

A more complete understanding of the invention may be obtained from consideration of the following description in conjunction with the drawings in which:

FIG. 7 is a diagram illustrating the format of a broadcast announcement message for use in conjunction with the wireless system 10 of FIG. 1, for informing WCDs that one or more broadcast messages are available.

DETAILED DESCRIPTION

Figure 1:
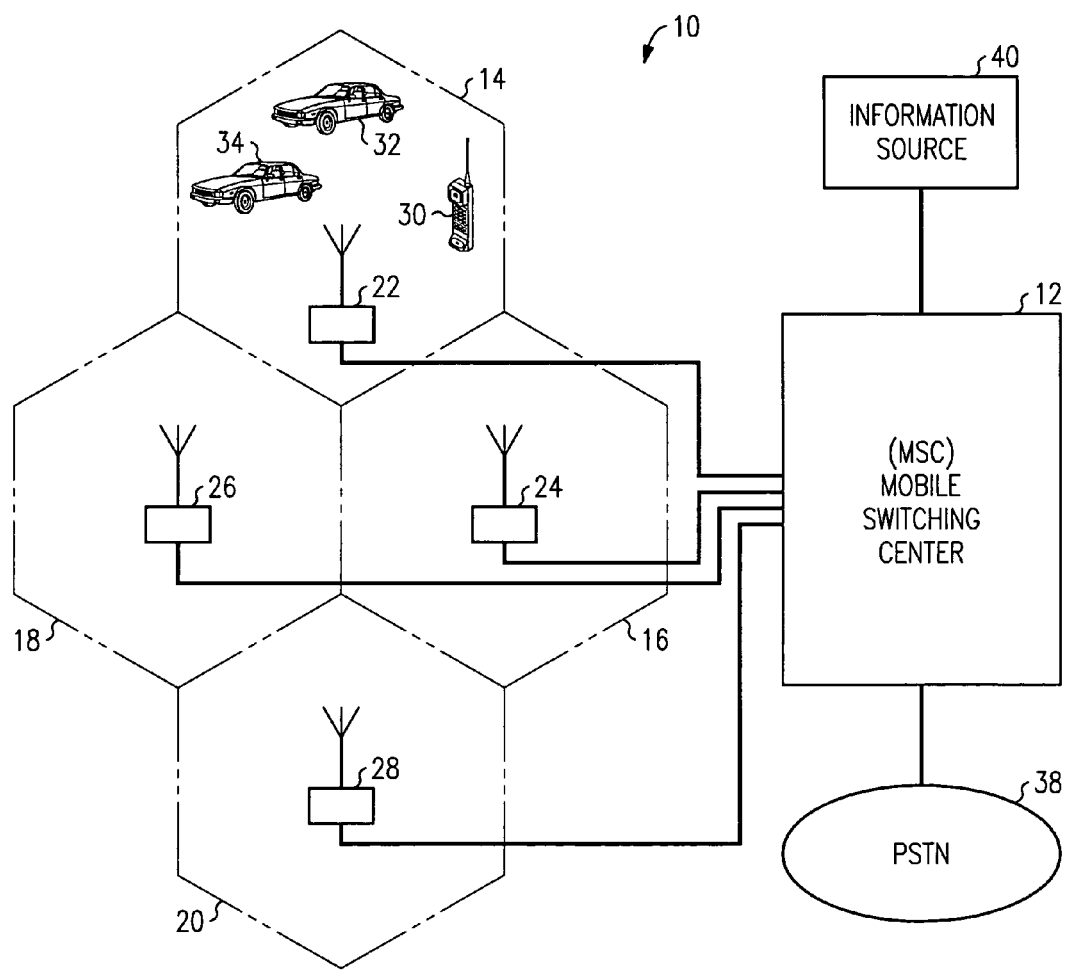
FIG. 1 is a block diagram of a preferred embodiment 10 of a wireless system constructed in accordance with the present invention.

A preferred embodiment of a system for providing broadcast channels in wireless telephony applications is shown in FIG. 1. FIG. 1 is a block diagram of a wireless telephone system 10, shown for clarity in simplified form.

The invention will be described herein in the context of a wireless system employing the Code Division Multiple-Access (CDMA) technology for radio transmission between base stations and wireless communications devices (WCDs). One embodiment of CDMA technology is described in Telecommunications Industry Association standard TIA/IS-95-A, entitled "Mobile Station-Base Station Compatibility Standard for Dual-Mode Wideband Spread Spectrum Cellular System." One skilled in the art will appreciate that the invention disclosed herein is not limited to CDMA systems and could be applied to wireless systems employing other transmission technologies, or air interfaces, whether deployed now or in the future, including TDMA, GSM, "analog cellular," and the like. The skilled artisan will understand how to modify the embodiments disclosed herein for operation in those environments. The WCDs disclosed herein may be mobile or portable telephones, but could also be other types of wireless subscriber terminals, such as pagers, data terminals, or computers.

The wireless system 10 comprises mobile switching center (MSC) 12, which serves a plurality of relatively small geographic regions 14, 16, 18, and 20 commonly referred to as cells. Each cell contains a base station or cell site 22, 24, 26, 28, which is connected to the MSC 12 and which communicates with WCDs such as 30, 32, and 34, thereby providing the interface between the MSC and the WCDs.

Mobile switching center 12 is connected to the public switched telephone network 38. For purposes of describing an exemplary embodiment of this invention, mobile switching center 12 is also connected to an information source 40, which may be any suitable source for the content of a broadcast message. The broadcast message may, for example, be a report of sports headlines and scores, stock quotes, emergency alerts, e.g. severe weather warnings, etc. The broadcast message could also be any other program material suitable for transmission via a broadcast medium, including, for example, an audio message. Although shown external to the MSC 12, the information source 40 could also be integrated with the MSC, or could be external to and remote from the wireless system 10. The information source may be recorded or "live", and in some instances may be a person placing a call via a land-line telephone or WCD. In this exemplary embodiment of this invention, MSC 12 comprises a control system and switching system capable of operating in conjunction with the transmission technology used by the wireless system. For a CDMA wireless system, the switching system may be a 5ESS® switch available from Lucent Technologies, Murray Hill, N.J. It will be apparent to one skilled in the art how to adapt this invention to other forms of wireless communications, as will be explained further below.

Figure 2:
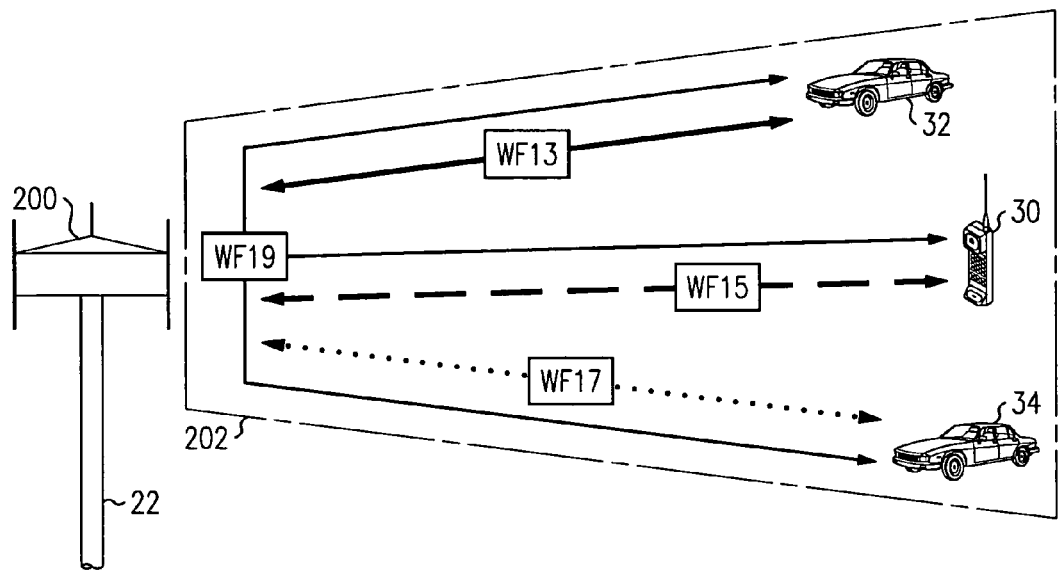
FIG. 2 is a diagram illustrating communications channels allocated within a particular cell of the wireless system 10 of FIG. 1 for ordinary, bi-directional traffic between the base station and WCDs, and for broadcast messages from the base station to WCDs.

FIG. 2 illustrates a preferred embodiment of this invention in the context of cell 14. Cell 14 includes base station 22, which includes antenna 200. As is known in the art, antenna 200 may have several faces (usually three) which serve sectors within cell site 14. Illustrated here is one sector 202 in which there are three mobile units 30, 32 and 34.

In CDMA telephony, a single radio-frequency (RF) channel, or "carrier" can support multiple simultaneous conversations on separate traffic channels. The mobile units 30, 32, 34 are each assigned to a different respective traffic channel of a single CDMA carrier. To aid clarity, when describing the cell sites herein, only a single CDMA carrier is discussed. However, as is known in the art, a cell site may employ multiple CDMA carriers. In the forward link (from the base station to the mobile radios), each user's traffic channel is processed with its own $\frac{1}{64}$ long code (for privacy) and its own Walsh function. Walsh functions are mathematically orthogonal to each other and are used to encode each traffic channel so as to better separate the traffic channels on the carrier. All of the Walsh-coded traffic channels are combined, and the resulting composite signal is transmitted over the RF channel. Each mobile radio 30, 32, 34, receives the composite signal and extracts its designated traffic channel (as is known in the art) by processing the composite signal with the same Walsh function used to process the designated traffic channel at the base station. In CDMA systems complying with the TIA/IS-95-A standard, for each CDMA encoded RF channel, there are 64 Walsh functions, about 55 of which are available for calls. In typical practice, not all of the available Walsh functions are used on any given RF channel.

According to the prior art, each user in a cell (or sector) is assigned a distinct traffic channel comprising a forward (i.e., base station-to-user) path and a reverse (i.e., user-to-base station) path; these paths are sometimes referred to as channels, but it will be appreciated that in combination, they form a single, full-duplex communications path or channel.

In a preferred embodiment constructed according to the present invention, and contrary to the teachings of the prior art, a single traffic channel is used to communicate to multiple users at the same time. In this exemplary embodiment, base station 22 receives a broadcast message through MSC 12 from information source 40. Base station 22 transmits the resulting broadcast on a suitable available traffic channel. For example, in a CDMA system as described herein, the base station 22 (FIG. 2) transmits the broadcast over the CDMA RF carrier on an available traffic channel of that carrier, along with the other traffic channels, by encoding the broadcast message using the corresponding Walsh function (e.g. Walsh function number 19). Also, a new or existing public $\frac{1}{64}$ long code is used so the broadcast message can be received by all the intended recipients of the broadcast message. As best seen in FIG. 2, all three WCDs 30, 32, 34 can be involved in calls and assigned to different traffic channels, using different Walsh functions, and different long codes on the RF carrier, while a broadcast message is being transmitted. The use of Walsh functions and public $\frac{1}{64}$ long codes is characteristic of known CDMA wireless systems. As another example, in an embodiment employing an analog cellular system, the base station would transmit the broadcast message on an available narrow-band FM radio channel.

Regardless of the air interface or transmission technology, the base station also populates and transmits immediately, and on a periodic basis thereafter, an alert message, hereinafter referred to as a broadcast announcement message (BAM), indicating that the broadcast message is being transmitted (possibly along with others). Such alert or broadcast announcement messages may take the form of control messages of the types permitted by the associated air interface or transmission technology, the specifications for which may be enhanced from time to time. The control messages are preferably broadcast on an overhead channel (traffic control channel) and are received by all WCDs 30, 32, 34, within the range of the antenna or within the range of the face of the antenna, such as coverage area 202. In systems in which the associated air interface permits, the broadcast announcement messages could, in addition, be transmitted on the traffic channels.

As best seen in FIG. 7, the broadcast announcement message 710 preferably contains several pieces of information which allow the WCDs to determine how to handle the message. The broadcast announcement message 710 preferably contains the traffic channel number 712 which the WCD must select or tune in order to receive the broadcast. The broadcast announcement message 710 preferably also contains a display parameter 714, describing the source and/or the nature of the message. If the broadcast message is a subscriber-initiated message, the display parameter may include the sender's name. Parameters such as the display parameter 714 may be changed from time to time to indicate to the WCD that the status of a broadcast message has changed. The WCDs may use one or more of these parameters to determine whether the broadcast message status has been changed, and if so, to alert the user.

The broadcast announcement message 710 preferably also has a permission parameter 716 and a priority parameter 718. The permission parameter may be used by the system operator to identify which WCDs or subscribers, or classes of WCDs or subscribers, may have access to the associated broadcast message. For example, the permission parameter may comprise a list of serial numbers or mobile identification numbers (MINs). A device receiving the permission parameter may compare the list of serial numbers or MINs with the device's own serial number or MIN, and if a match is found, the device is authorized to receive the associated message. However, other permission schemes could also be used, as is well known in the art. The WCD preferably enforces the permission policy by examining the permission parameter 716, and responsive thereto determining whether the associated broadcast message is either a message for which the user has subscribed (individually or as a class of users), or a message available to all users without subscription.

The priority parameter 718 allows the system to associate indicia of priority with each message. The WCD may responsively determine the type of alert presented to the user. For example, the WCD may provide a distinctive alert for high priority messages, a normal alert for medium priority messages, and no alert for the lowest priority messages. As discussed further below, the WCD preferably switches automatically to the broadcast channel when the broadcast announcement message indicates the presence of a message designated as highly urgent.

The broadcast announcement message 710 may also have a parameter 720 indicating that the associated broadcast message has expired.

A separate broadcast announcement message may be transmitted for each active broadcast message. Alternatively, a plurality of different broadcast messages could be announced by transmitting one or a few broadcast announcement messages. In such cases, a plurality of tuples, each consisting of the data items shown in FIG. 7, and each corresponding to a distinct broadcast message, may be transmitted in a single broadcast announcement message. Each broadcast announcement message, or each tuple thereof, may have an identification, such as a broadcast number 722. The WCD may use the broadcast number 722 internally as a key to address tuples or broadcast announcement messages and/or to identify the associated broadcast to the user.

According to a further aspect of the invention, in some systems which permit arbitrary text messages to be displayed to the user, a simplified broadcast announcement message may be implemented. The broadcast announcement message may be transmitted simply as a message appearing as text on the display of the WCD, containing an advertisement indicating the availability of the broadcast, and an instruction to the user to place a call to a specified number or specialized dialing code. The MSC and/or the base station may intercept or receive such a call, recognize that the call is a request for the broadcast, and direct the WCD to the assigned traffic channel for that broadcast.

Each WCD receives the broadcast announcement message and notifies its respective user of the incoming broadcast message or messages. This notification may be visual, by means of a flashing light or message across the screen and/or audio by way of some form of tone or "beep".

Some users may not receive the broadcast announcement message when it is first sent. For example, a user may have turned off the WCD, or may have been located outside the coverage area of the wireless system 10. Broadcast announcement messages may be retransmitted from time to time to alert users who did not receive the message when first transmitted. Preferably, the WCD compares one or more parameters of each incoming broadcast announcement message with stored information from parameters of previously received broadcast announcement messages and alerts the user of changes in accordance with the priority of the change. If the parameters have not changed, the WCD may inhibit the alert. Alternatively, the WCD may compare the newly received message to a list of previously received broadcast announcement messages to determine whether the user has previously been alerted to the availability of the associated broadcast messages. If so, the WCD may suppress further notification to the user.

Broadcast messages may vary by sector, cell or other coverage area. When a user enters a new sector, cell, or other coverage area, a new broadcast announcement message is sent, so the WCD will have an indication of the broadcast messages currently available. If the WCD determines that a message is available in the new sector, cell, or coverage area, and that message was not previously available in the prior location, the WCD alerts the user of the new message.

As best seen in FIG. 2, all three WCDs 30, 32, 34 can be involved in calls and assigned to different traffic channels, using different Walsh functions, and different long codes on the RF carrier, while a broadcast message is being transmitted. According to an embodiment of the invention, each WCD 30, 32, and 34 (FIG. 2) then allows its user to toggle between the previously assigned traffic channel and the broadcast channel by pressing one or more keys, or providing some other input to the WCD. For example, the WCD may be arranged such that any of the keys on the standard number pad, a special function key, a switch, encoder, or a touch sensitive display may be operative to activate the toggle function. In this example, a user, for example the user of WCD 30, can direct the WCD to play the broadcast. The WCD switches to the traffic channel assigned to the broadcast, as indicated in the broadcast announcement message. Alternatively, the user may elect to do nothing and remain on the previously-assigned traffic channel using Walsh function number 15. In a particular cell or sector of the wireless system 10, all users receiving a particular broadcast will do so using the same traffic channel. In the CDMA system of FIG. 2, for example, the WCD selects the traffic channel by processing the composite CDMA signal with the Walsh function (e.g., Walsh function number 19) and the public $\frac{1}{64}$ long code (not shown) assigned to the broadcast message. In an embodiment employing an analog cellular system, the WCD selects the assigned traffic channel by tuning its receiver to the corresponding narrow-band FM radio frequency.

If the user directs the WCD to decode the broadcast message, the WCD preferably inhibits transmitting on the reverse (WCD-to-base station) path of the traffic channel assigned to the broadcast, in order to limit interference. Because some WCDs may not have a provision to inhibit transmission on the reverse path, as an alternative, or in addition, the base station preferably transmits power control instructions to all WCDs receiving the broadcast message to minimize transmitter power. Moreover, whatever may be received on the reverse path during the broadcast message should be discarded. Accordingly, the base site or MSC preferably takes action to mute the signal received on the reverse path so that such received signal is not introduced into the forward audio path as sidetone, echo, or hybrid-induced cross-talk. However, in some applications, it may be desirable to allow users to communicate on the reverse channel. In that case, the WCD may allow limited transmission on the reverse channel to allow users to, for example, transmit short keypad sequences in response to menu items conveyed in the broadcast message, or for other appropriate purposes.

When the broadcast message ceases to be received by the base station from the information source 40, the base station maintains the forward path of the broadcast channel for a brief period. The base station updates the broadcast announcement message to indicate the expiration 720 (see FIG. 7) of the broadcast message and the imminent expiration of the broadcast channel. Upon receipt of this message, each user's WCD changes its display accordingly and automatically switches the user back to his or her previous traffic channel if the user has not already manually switched back. Soon thereafter, the base station releases the traffic channel assigned to the broadcast.

Figure 3:
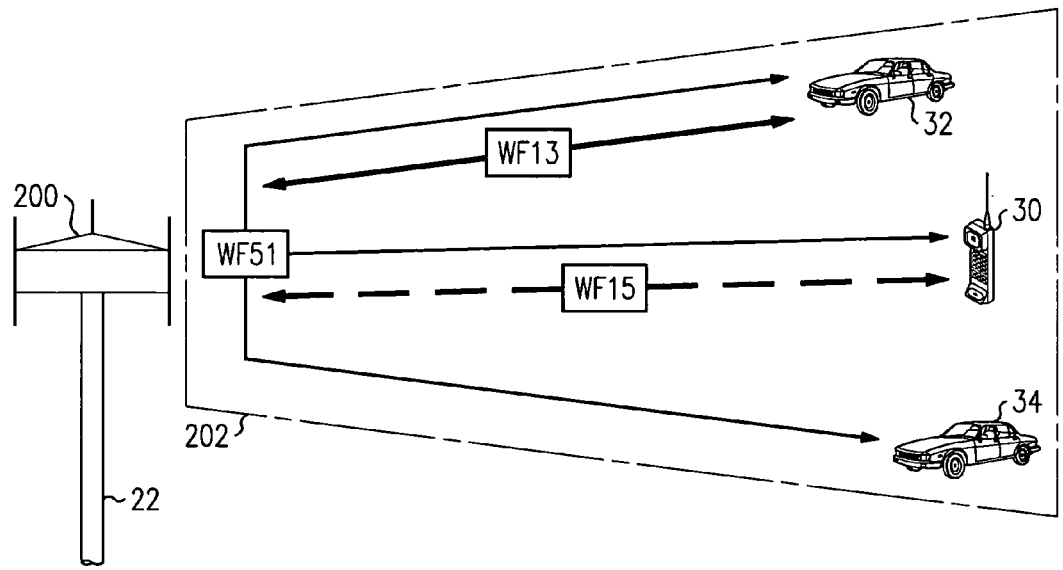
FIG. 3 is a diagram illustrating communications channels allocated within a particular cell of the wireless system 10 of FIG. 1, for both ordinary traffic and broadcast traffic, in which a broadcast channel is available on a continuous basis.

According to another aspect of the present invention, multiple broadcast channels may be made available, each on a continuous or occasional basis, in each cell or sector of the wireless system 10. As best seen in FIG. 3, first and second users 32 and 30, respectively, are involved in calls over a single CDMA RF channel. The call of the first user 32 is assigned to traffic channel 13 (i.e., encoded using Walsh function number 13), and the call of the second user 30 is assigned to traffic channel 15 (i.e., using Walsh function number 15). A third user 34 has his phone turned on but is not involved in a call.

Base station 22 transmits continuously a broadcast message, which may be an informational message such as time, temperature, traffic conditions, stock reports, or the like, using traffic channel 51 (i.e., the message is transmitted over the CDMA RF carrier using Walsh function number 51). The base station 22 also populates and transmits on a periodic basis a broadcast announcement message indicating that the broadcast message is being transmitted. All three WCDs currently receiving the RF carrier acquire the broadcast announcement message and indicate to the user the availability of the continuously-transmitted broadcast message. Even though the user of WCD 34 is not involved in a call, the user receives an indication that the broadcast message is available. Each active caller may toggle between his/her traffic channel and the broadcast message by activating a control on the WCD, as described above. The user of WCD 34, which is not on a call, can also activate one or more controls to access the message. As above, when a user is receiving the broadcast channel, transmission on the reverse path is preferably inhibited, or appropriate power control is applied, to limit interference.

Figure 4:
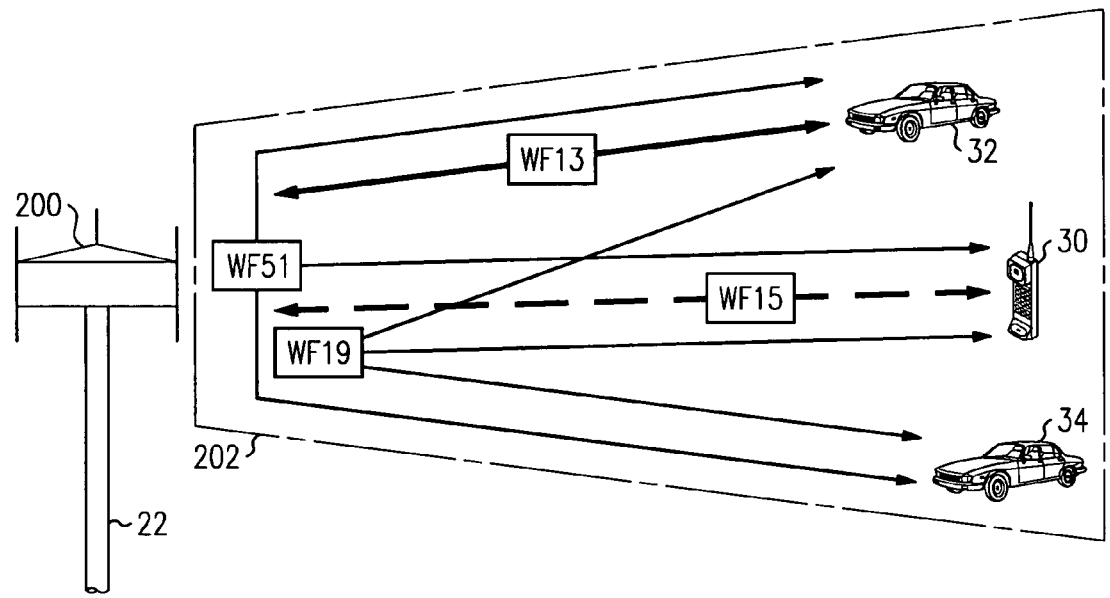
FIG. 4 is a diagram illustrating communications channels allocated within a particular cell of the wireless system 10 of FIG. 1, for both ordinary traffic and broadcast traffic, in which multiple broadcast channels are provided, including a continuously transmitted broadcast channel and a broadcast channel transmitted on an occasional basis.

In addition to continuously transmitted broadcast messages, the base station may transmit one or more broadcast messages on an occasional basis. This may be useful for alerting users to an urgent situation. For example, an emergency weather bulletin may be transmitted from a base station to warn subscribers of a tornado approaching a particular cell, or sector of a cell. The base station may use a predetermined traffic channel (for example, traffic channel 19, transmitted using Walsh function number 19), for transmitting broadcast messages of this type. The occasional broadcast message is transmitted along with all other traffic on the CDMA radio frequency, as illustrated in FIG. 4. The transmitted broadcast announcement message is updated to reflect that two broadcast messages are now active. Each WCD in the cell receives the broadcast announcement message and alerts the user to the new incoming broadcast message by beeping and/or by updating its display to show the presence of both broadcast channels. Each user (including those not on a call) may access either of the broadcast messages by activating one or more controls.

Advantageously, as discussed above, the broadcast announcement message 710 preferably has a priority parameter 718 which may be encoded to indicate that the weather warning message is urgent. Preferably, the active callers may be automatically switched (i.e. forced) to the channel assigned to the urgent broadcast to hear the weather warning. If a user involved in a call or another broadcast is automatically switched to a broadcast channel through this mechanism, the wireless system 10 preferably plays a brief announcement to the user, and if the user was involved in a call, the distant party, to advise the user and distant party of the reason for the impending switch. If a user is automatically switched, the user may nonetheless toggle between the urgent broadcast message and the previous activity at will.

As an alternative to the priority parameter 718, a predefined traffic channel number may be allocated for emergency broadcast messages. In that case, the presence of a broadcast on the allocated channel would be interpreted as an indication of the emergency, and the broadcast would be treated by the WCD as though a priority parameter were present and set to the urgent value. As discussed above, when a user is receiving the broadcast channel, transmission by that user's WCD on the reverse path is preferably inhibited, or appropriate power control is applied, to limit interference.

When the warning message expires, the base station maintains the forward path of the traffic channel assigned to the broadcast message for a brief period. The base station updates the broadcast announcement message to indicate the expiration of the warning message and the imminent expiration of the broadcast channel. Upon receiving the updated broadcast announcement message, each WCD changes its display accordingly and automatically switches the user back to the channel which was previously in use (if any), such as his or her traffic channel or to a previously-selected broadcast channel (unless the user has manually switched to another channel). Soon thereafter, the base station releases the traffic channel which had been assigned to the broadcast message.

Figure 5:
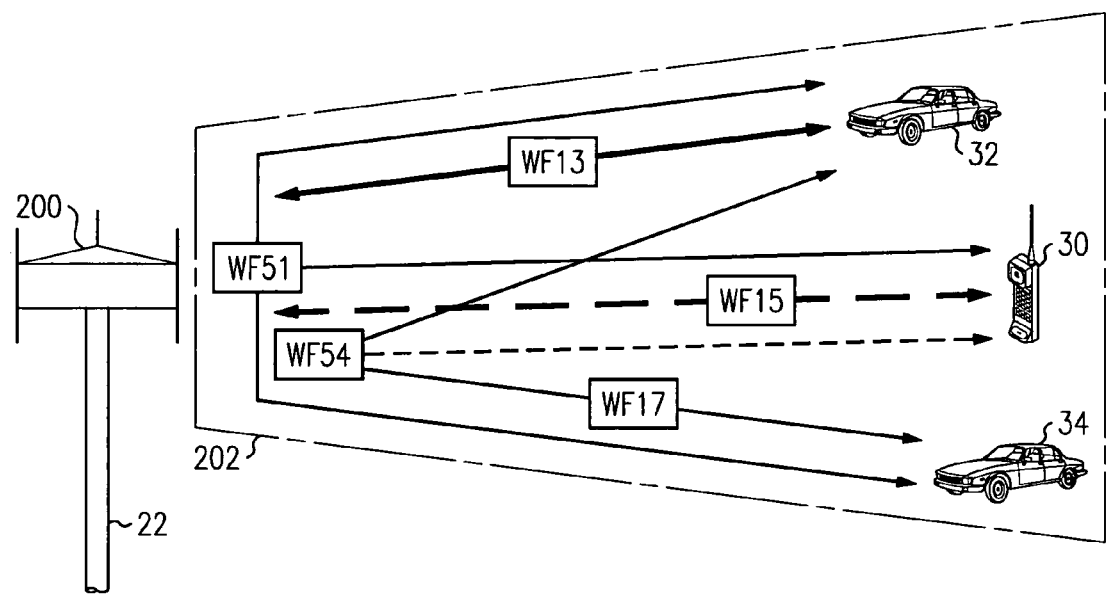
FIG. 5 is a diagram illustrating communications channels allocated within a particular cell of the wireless system 10 of FIG. 1, for both ordinary traffic and broadcast traffic, in which one of the broadcast channels is made available selectively to different users.

According to another aspect of the present invention, broadcast messages to a plurality of subscribers may be initiated by another subscriber. See FIG. 5. This feature may, for example, be used by public safety agencies to alert simultaneously a large number of emergency personnel, such as firefighters, police officers, or other emergency rescue units. When a subscriber attempts to initiate a broadcast, the MSC determines whether that subscriber has authority to initiate such a broadcast. If the subscriber has such authority, the MSC determines, responsive to selection by the subscriber of a predefined list of recipients stored on the MSC, which WCDs will be permitted to receive the broadcast. This is best seen in FIG. 5, which depicts a subscriber-initiated broadcast to WCDs 32 and 34 only. The permission data stored in the MSC indicates that only the users of WCDs 32 and 34 are permitted to decode the message.

Base station 22 transmits the subscriber-initiated broadcast message over the CDMA RF carrier using traffic channel 54 (i.e., encoded with Walsh function 54). A broadcast announcement message is transmitted to reflect that now two broadcast channels are active. A display parameter 714 is preferably included in the broadcast announcement message. The display parameter 714 may contain data describing the sender and/or the nature of the subscriber-initiated message. A permission parameter 716 is also preferably included, specifying which mobiles are permitted to access which broadcast channels. As best seen in FIG. 5, the arrow representing traffic channel 54 to WCD 30 is rendered in an interrupted line to signify that although all of the traffic channels on the CDMA carrier, including traffic channel 54, are transmitted to WCD 30, WCD 30 is not authorized to access the broadcast message on that channel.

Upon receiving the updated broadcast announcement message, each WCD checks the permission parameter 716 to see if it has permission to decode the subscriber-initiated broadcast message. WCDs 32 and 34 will momentarily beep and update their displays using the new information sent in the display parameter. WCD 30 will neither beep nor update its display, nor allow its user access to the new message. It will, however continue to display the presence of and allow access to the continuously transmitted broadcast message on traffic channel 51 (i.e., using Walsh function number 51). Users 32 and 34 may then toggle between the earlier broadcast messages and the subscriber-initiated broadcast message, or may ignore the availability of the subscriber-initiated broadcast message, or, if a call was previously active, may return to the call.

Figure 6:
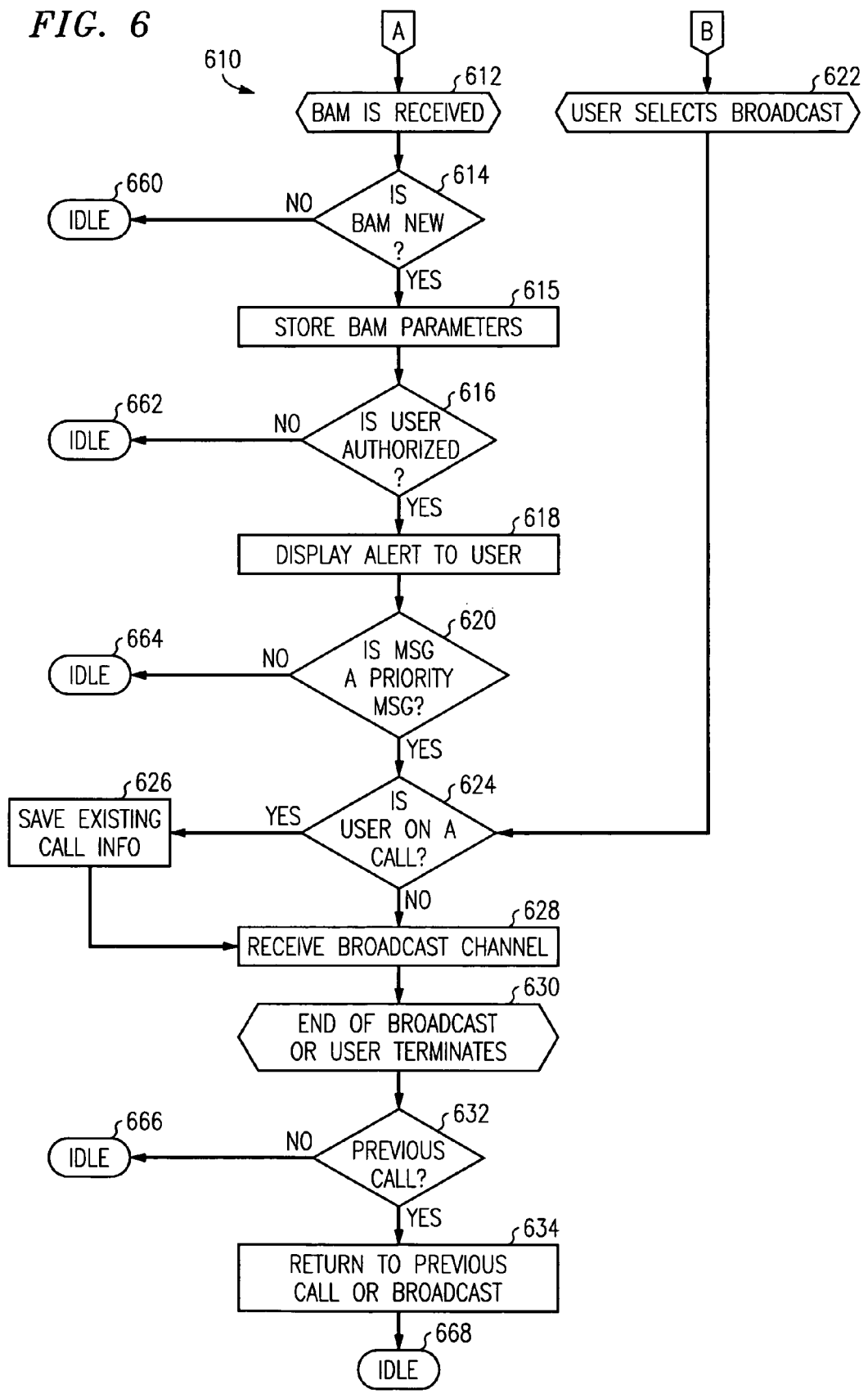
FIG. 6 is a flow diagram illustrating an exemplary method 610 which may be used in conjunction with the wireless system 10 of FIG. 1 to control the operation of a WCD in response to a broadcast announcement message (BAM) to provide the contents of a broadcast to the user.

FIG. 6 is a flow diagram depicting a method 610 which may be used in conjunction with the wireless system 10 to control the operation of a WCD in response to a broadcast announcement message and/or a user request to provide the contents of a broadcast to the user. At the beginning of method 610, the WCD is assumed to be idle, with respect to its functions of receiving and processing broadcast messages, but of course may be performing processing or other functions with which it is normally occupied, including handling an existing call. References in this discussion to the WCD being idle are describing only the state of the WCD with respect to the functions of receiving and processing broadcast messages. The method begins at step 612 in which the WCD receives a broadcast announcement message. The method may be considered to be "interrupt driven", in the sense that the WCD may be idle, or may be processing a call, or performing other functions, when the broadcast announcement message is received, upon which the WCD begins executing the method at step 612. As is known in the art of controlling complex communication devices, the WCD may also be performing other control and processing functions simultaneously or interspersed with the functions of method 610 using multitasking or other known techniques.

In step 614, the WCD inspects the parameters of the broadcast announcement message to determine whether any associated broadcast is new or has changed state, such that the user should be alerted. If no broadcast message parameters are new, and the status of none of the broadcast messages has changed, the WCD stops processing the broadcast announcement message and returns to an idle state at step 660. However, if the broadcast message is new or has changed status, the method continues in step 615, in which information or parameters relating to the new broadcast message are stored for subsequent reference.

In step 616, the WCD evaluates the permission parameter 716 to determine whether the user is authorized to access the broadcast message. If the user is not authorized, the WCD stops processing the broadcast announcement message and returns to an idle state at step 662. If the user is authorized, the method continues in step 618, in which the user is alerted to the availability of the broadcast message via the WCD display or other indicia. In step 620, the WCD evaluates the priority parameter 718 to determine whether the message is an urgent priority message. If so, the broadcast message must be received, and therefore the method jumps to step 624. If not, the WCD enters an idle state at step 664, as the user is not required to receive a non-priority message. However, the user may independently choose to receive the broadcast message associated with the recently-received broadcast announcement message, or any other broadcast message for which a broadcast announcement message has been received and the user is authorized (see step 622). If the user chooses to receive a broadcast message, the user activates an appropriate control on the WCD. Activation by the user of the broadcast-message-receive function is depicted in step 622. The "interrupt-driven" method then continues in step 624.

In step 624, the WCD determines whether the user is already involved in a call or a broadcast message. If not, the method continues at step 628. If the user is involved in a call or broadcast message, the WCD executes step 626, in which the information regarding the call or broadcast message is saved so that the user may return to the call or broadcast message after the selected broadcast message ends or is abandoned. Then the WCD proceeds to step 628. Preferably, the distant party involved in such a call is effectively placed on hold, and the base station may treat the communications path as though the WCD were still participating in the call. This treatment may continue until such time as the WCD returns to the traffic channel assigned to the call. If a user involved in a call or another broadcast is automatically switched to a broadcast channel as a result of an urgent priority broadcast message, at the time of the switch the wireless system 10 preferably plays a brief announcement to the user, and if the user was involved in a call, the distant party, to advise the user and distant party of the reason for the impending switch.

In step 628, the WCD receives the traffic channel allocated to the broadcast message, as identified by a parameter 712 of broadcast announcement message 710. The broadcast message is played to the user as it is received. In step 630, the WCD determines whether the broadcast message has ended or the user has requested to abandon the broadcast. If so, the method continues in step 632. Otherwise, the WCD continues to play the broadcast message, unless the user takes some action to terminate receipt. During receipt of a broadcast message, of course, a new broadcast announcement message may be received. In that case, the new broadcast announcement message will be processed as has been previously described. The currently playing broadcast message would be interrupted only if the new broadcast announcement message describes an urgent priority message or the user independently chooses to switch to the new message.

In step 632, reached when the broadcast has terminated, or when the user has requested to terminate reception of the broadcast, the WCD determines whether the user was involved in a call or another broadcast message at the time the most recent broadcast was received. If not, the WCD returns to an idle state at step 666. If, however, a previously-active call or broadcast message was saved and is available to be restored, the WCD executes step 634, in which the previous call or broadcast message is restored. The WCD then returns to an idle state at step 668.

It is to be understood that the above-described invention embodiments are merely illustrative of the invention, and that many variations may be devised by those skilled in the art without departing from the scope of this invention. It is, therefore, intended that such variations be included within the scope of the claims.

What is claimed is:

1. A method for use in a wireless network, said wireless network comprising a plurality of base stations, each serving a plurality of users via a plurality of communication channels, said method comprising the steps of:

transmitting an alert message from a set of said base stations, to a plurality of users, said alert message including the identity of one of said plurality of communication channels, said alert message indicating to said plurality of users that a broadcast message is available on one of said plurality of communication channels identified in said alert message; and transmitting said broadcast message from said set of base stations to said plurality of users on said one of said plurality of communication channels;

wherein said plurality of users has an option to selectively receive said broadcast message over said one of said plurality of communications channels.

2. The method of claim 1 wherein said wireless network also includes a control channel, wherein said step of transmitting said alert message comprises transmitting said alert message on said control channel.

3. The method of claim 1 wherein said step of transmitting an alert message further comprises the step of transmitting a permission parameter as a part of said alert message.

4. The method of claim 1 wherein said step of transmitting said alert message further comprises repeatedly transmitting an alert message on a periodic basis while said broadcast message is transmitted.

5. The method of claim 1 further including the step of, after said set of base stations complete transmission of said broadcast message, said set of base stations sending a further alert message to inform the users that said one of said plurality of communication channels will expire in a predetermined time.

6. The method of claim 5 further including, after expiration of said predetermined time, said set of said base stations ceasing to broadcast on said communication channel, and returning said channel for further use.

7. The method of claim 1 wherein said one of said plurality of communication channels is selected from a reserved group of said plurality of communication channels.

8. The method of claim 1 wherein said one of said plurality of communication channels is selected from the list of idle ones of said plurality of communication channels.

9. The method of claim 1 wherein said alert message includes the identity of said one of said plurality of communication channels such that each of said plurality of base stations selects the same one of said plurality of communication channels.

10. The method of claim 1 wherein each of said plurality of base stations selects one of said plurality of communication channels based on channel availability, wherein said one of said plurality of communication channels may be different between each of said base stations.

11. The method of claim 1 wherein said broadcast message originates at an information source remote from said base stations.

12. A wireless unit for use with a wireless communications network, wherein said wireless unit receives control messages on a preassigned channel and communicates content on a channel that is assigned for such communication, said wireless unit comprising:

means for receiving a first alerting message indicating that a broadcast message is imminent, and indicating the communication channel of said broadcast message;

means for alerting a user of said wireless unit that said broadcast message is imminent;

means for setting up said wireless unit for selectively receiving said communication channel in response to action by the user responsive to the first alerting message means for storing a current state of said wireless unit before setting up said wireless unit for receiving said communication channel; and means for receiving a second alerting message indicating that said broadcast message is over and for automatically restoring said wireless unit to said stored state upon receipt of said second alerting message.

13. A wireless unit in accordance with claim 12 further comprising user means for selecting whether to receive said broadcast message.

14. A wireless unit in accordance with claim 13 wherein said to wireless unit includes a keypad, wherein said user means for selecting comprises entering one or more digits on said keypad.

15. A wireless unit in accordance with claim 13 wherein said wireless unit includes a keypad, wherein said user means for selecting comprises a button separate from said keypad.

16. A wireless unit in accordance with claim 12 wherein said wireless unit uses CDMA protocol, wherein said communication channel is extracted using a corresponding one of a plurality of Walsh functions.

17. A wireless unit in accordance with claim 12 wherein said wireless unit uses an analog air interface protocol, wherein said communication channel is extracted using an FM receiver tuned to a corresponding frequency.

18. A wireless unit in accordance with claim 12 wherein said wireless unit uses a TDMA protocol, wherein said communication channel is extracted using a receiver tuned to a corresponding frequency and selecting appropriate time slots of a received TDM data stream.

19. A wireless unit in accordance with claim 12 wherein said means for alerting comprises a user-audible signal.

20. A wireless unit in accordance with claim 12 wherein said means for alerting comprises a user-visible signal.

21. A wireless unit in accordance with claim 12 wherein said wireless unit includes a display, wherein said displayed indicates when said wireless unit is receiving said broadcast message.

22. A wireless unit in accordance with claim 12 wherein said communication channel comprises a forward link and a reverse link, and said wireless unit includes means for blocking automatically said reverse link of said communication channel for the duration of said broadcast message.

23. A base station for use in a wireless network, said base station serving a plurality of users via a plurality of communication channels, said base station comprising:

means for transmitting an alert message to a plurality of users, said alert message including the identity of one of said plurality of communications channels, said alert message indicating availability of an imminent broadcast message over said one of said plurality of communication channels; and means for transmitting said imminent broadcast message to said plurality of users on said one of said plurality of communications channels;

wherein said plurality of users has an option to selectively connect to said one of said plurality of communication channels to receive said imminent broadcast message.

24. A base station in accordance with claim 23 wherein said means for transmitting said alert message comprises a control channel.

25. A base station in accordance with claim 23 further including means for sending a further alert message to inform the users that the channel will expire shortly after said base station completes transmission of said prerecorded message.

* * * * *